United States Patent [19]
Suda et al.

[11] Patent Number: 5,877,885
[45] Date of Patent: Mar. 2, 1999

[54] SCANNING APPARATUS HAVING A CASCADE SCANNING OPTICAL SYSTEM

[75] Inventors: Tadaaki Suda; Nobuyuki Hori, both of Saitama-ken, Japan

[73] Assignee: Asahi Kogaku Kogyo Kabushiki Kaisha, Tokyo, Japan

[21] Appl. No.: 992,808

[22] Filed: Dec. 18, 1997

[30] Foreign Application Priority Data

Dec. 26, 1996 [JP] Japan ..................................... 8-348107

[51] Int. Cl.⁶ .................................................. G02B 26/08
[52] U.S. Cl. .......................... 359/201; 359/204; 359/216; 250/235; 250/236
[58] Field of Search ..................................... 359/201–204, 359/212, 216–219; 347/233, 235, 237, 241, 243, 256–261; 358/474, 494, 296, 302; 250/234–236

[56] References Cited

U.S. PATENT DOCUMENTS 5,654,817 8/1997 De Loor ................................... 359/201

FOREIGN PATENT DOCUMENTS 61-57316 4/1985 Japan .
61-11720 1/1986 Japan .

*Primary Examiner*—James Phan
*Attorney, Agent, or Firm*—Greenblum & Bernstrin, P.L.C.

[57] ABSTRACT

A scanning apparatus. The scanning apparatus has a cascade scanning optical system in which a scanning line, made by a scanning laser beam emitted by a first laser scanning optical system of a plurality of laser scanning optical systems, and a second scanning line emitted by a second laser scanning optical system of the plurality of laser scanning optical systems, are prevented from deviating from each other in either a main scanning direction or a sub-scanning direction.

14 Claims, 4 Drawing Sheets

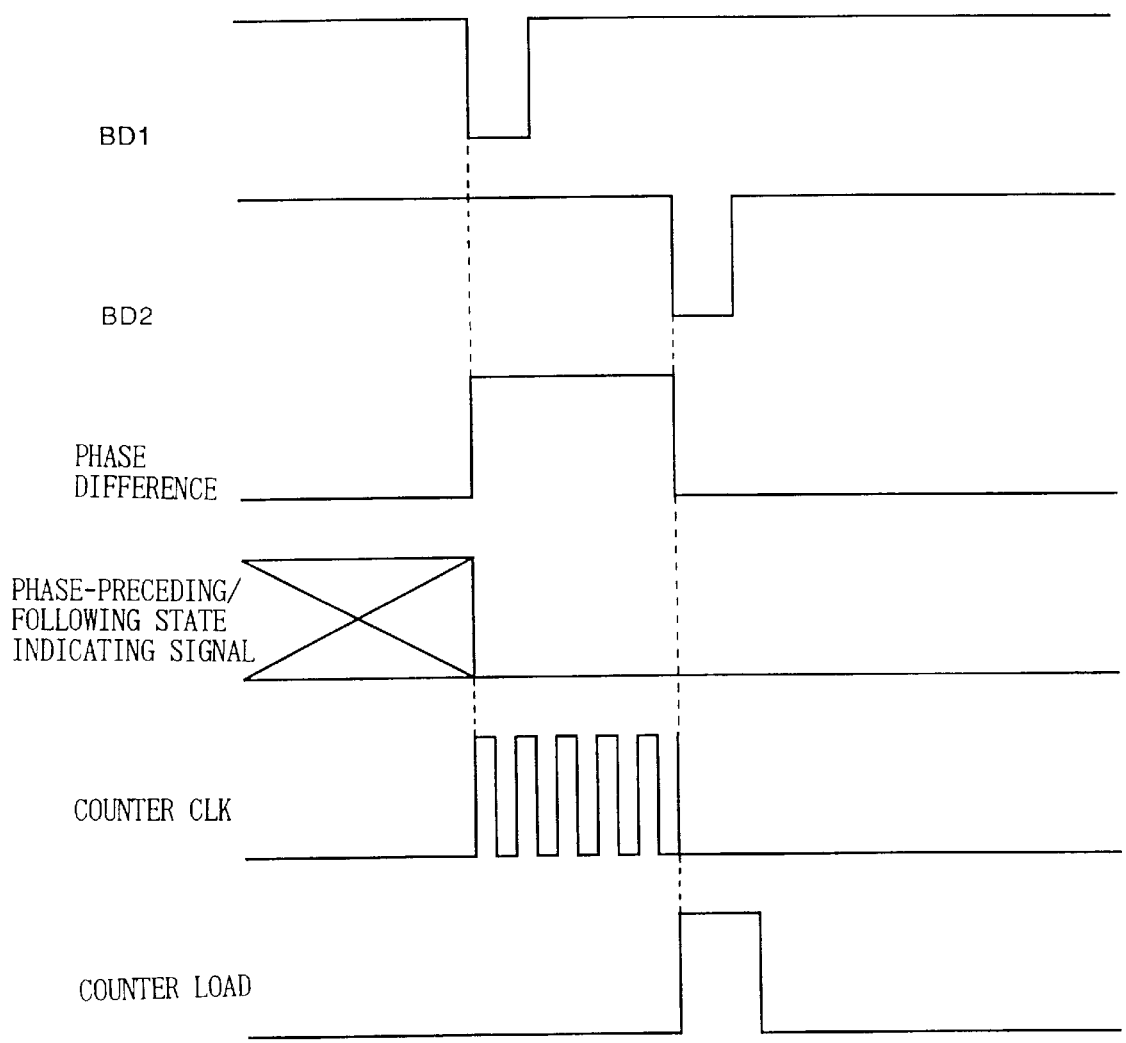

SCANNING APPARATUS HAVING A CASCADE SCANNING OPTICAL SYSTEM

BACKGROUND OF THE INVENTION

1. Field of the Invention

The present invention relates to a cascade scanning optical system having a pair of laser scanning optical systems which are arranged along the main scanning direction and controlled to operate in synchronization with each other so as to realize a wide scanning line. More specifically the present invention relates to a scanning apparatus having such a cascade scanning optical system in which the rotation of a polygon mirror of one laser scanning optical system is synchronized with the rotation of a polygon mirror of the other laser scanning optical system to prevent a pair of scanning lines that are to be aligned, respectively generated by the pair of laser scanning optical systems, from being deviated from each other in either the main scanning direction or the sub-scanning direction.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No. 61-11720, published on Jan. 20, 1986. This publication discloses a cascade scanning optical system having a pair of laser scanning optical systems each having a laser beam emitter, a polygon mirror serving as a deflecting device, an f θ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately aligned with another scanning line, made on the photoconductive drum by the scanning laser beam emitted from another laser scanning optical system of the cascade scanning optical system, so that the scanning lines are not apart from each other nor overlap each other in the main scanning direction, i.e., so as to form a straight and continuous scanning line using a combination of the separate scanning lines.

SUMMARY OF THE INVENTION

The primary object of the present invention is to provide a scanning apparatus having a cascade scanning optical system in which a scanning line, made by the scanning laser beam emitted from one of a pair of laser scanning optical systems, and another scanning line, made by the other laser scanning optical system, are prevented from deviating from each other in either the main scanning direction or the sub-scanning direction on a scanning surface.

To achieve the object mentioned above, according to an aspect of the present invention, there is provided a scanning apparatus having a cascade scanning optical system, including: a first laser scanning optical system having a first polygon mirror for deflecting a first scanning laser beam to scan a scanning surface to generate a first scanning line; a second laser scanning optical system having a second polygon mirror for deflecting a second scanning laser beam to scan the scanning surface to generate a second scanning line, wherein the first and second laser scanning optical systems are arranged so as to align the first scanning line with the second scanning line at a point of contact therebetween in a main scanning direction to form a single scanning line; a first rotating device for rotating the first polygon mirror; a second rotating device for rotating the second polygon mirror; a first laser beam detector for detecting the first scanning laser beam at a fixed position; a second laser beam detector for detecting the second scanning laser beam at a fixed position; a first controller for controlling the first rotating device to rotate the first polygon mirror at a constant speed; a counter for counting a difference in time between a first moment the first laser beam detector detects the first scanning laser beam and a second moment the second laser beam detector detects the second scanning laser beam by reference to the first moment; and a second controller for controlling the second rotating device to adjust a rotational speed of the second polygon mirror relative to the rotational speed of the first polygon mirror in accordance with the difference in time.

Preferably, the second controller controls the second rotating device to eliminate the difference in time.

Preferably, the first polygon mirror deflects the first scanning laser beam to scan a part of the scanning surface to generate the first scanning line, the second polygon mirror deflects the second scanning laser beam to scan another part of the scanning surface to generate the second scanning line, the first laser beam detector detects the first scanning laser beam before the first scanning laser beam scans the part of the scanning surface, and the second laser beam detector detects the second scanning laser beam before the second scanning laser beam scans the another part of the scanning surface.

Preferably, the first and second polygon mirrors rotate in opposite rotational directions so that the first and second scanning laser beams respectively scan the part and the another part of the scanning surface from an approximate center of the scanning surface toward respective opposite ends of the scanning surface in opposite directions.

Preferably, the scanning apparatus further includes: a clock pulse generator; and a phase-difference detector, which receives respective signals output from the first and second laser beam detectors, for detecting a phase difference between the phase of signals output from the first laser beam detector and the phase of signals output from the second laser beam detector, the magnitude of the phase difference corresponding to the duration of the difference in time, wherein the phase-difference detector generates a signal having a pulse duration corresponding to the magnitude of the phase difference, wherein the counter inputs clock pulses generated by the clock pulse generator to counts the clock pulses within a time-span corresponding to the difference in time, and wherein the second controller controls the second rotating device in accordance with the number of the counted clock pulses to eliminate the phase difference.

Preferably, the phase-difference detector judges whether the second moment is ahead or behind the first moment.

Preferably, the counter decreases the number of the clock pulses when the phase-difference detector judges that the second moment is ahead the first moment, and wherein the counter increases the number of the clock pulses when the phase-difference detector judges that the second moment is behind the first moment.

Preferably, the counter increases the number of the clock pulses when the phase-difference detector judges that the second moment is ahead the first moment, and wherein the counter decreases the number of the clock pulses when the phase-difference detector judges that the second moment is behind the first moment.

Preferably, the first controller includes a first frequency divider for dividing a frequency of clock pulses output from the clock pulse generator to output a resulting frequency of clock pulses to the first rotating device so as to rotate the first polygon mirror at the constant speed, and wherein the second controller includes a second frequency divider for dividing the frequency of clock pulses output from the clock pulse generator to output a resulting frequency of clock pulses to the second rotating device, the second controller varies the resulting frequency of clock pulses output to the second rotating device in accordance with the number of pulses.

Preferably, the scanning apparatus further includes a processor for controlling emissions of the first and second scanning laser beams in accordance with signals output from the first and second laser beam detectors.

According to another aspect of the present invention, there is provided a scanning apparatus having a cascade scanning optical system, the cascade scanning optical system including a pair of laser scanning optical systems each having a polygon mirror, the pair of laser scanning optical systems being arranged to form a single scanning line, wherein the scanning apparatus includes: a first rotating device for rotating one of the polygon mirrors; a second rotating device for rotating the other polygon mirror of the polygon mirrors; a phase-difference detector for detecting a phase difference between a phase of rotation of one of the polygon mirrors and a phase of rotation of the other polygon mirror of the polygon mirrors; and a controller for controlling at least one of the first and second rotating devices to adjust a rotational speed of one of the polygon mirrors relative to a rotational speed of the other polygon mirror of the polygon mirrors in accordance with the phase difference detected by the phase-difference detector.

The present disclosure relates to subject matter contained in Japanese Patent Application No. 8-348107 (filed on Dec. 26, 1996) which is expressly incorporated herein by reference in its entirety.

BRIEF DESCRIPTION OF THE DRAWINGS

The invention will be described below in detail with reference to the accompanying drawings in which:

FIG. 4 is a time chart showing timings of signals output from laser beam detectors provided in the control circuit shown in FIG. 2 and some other signals.

DESCRIPTION OF THE PREFERRED EMBODIMENT

Figure 1:
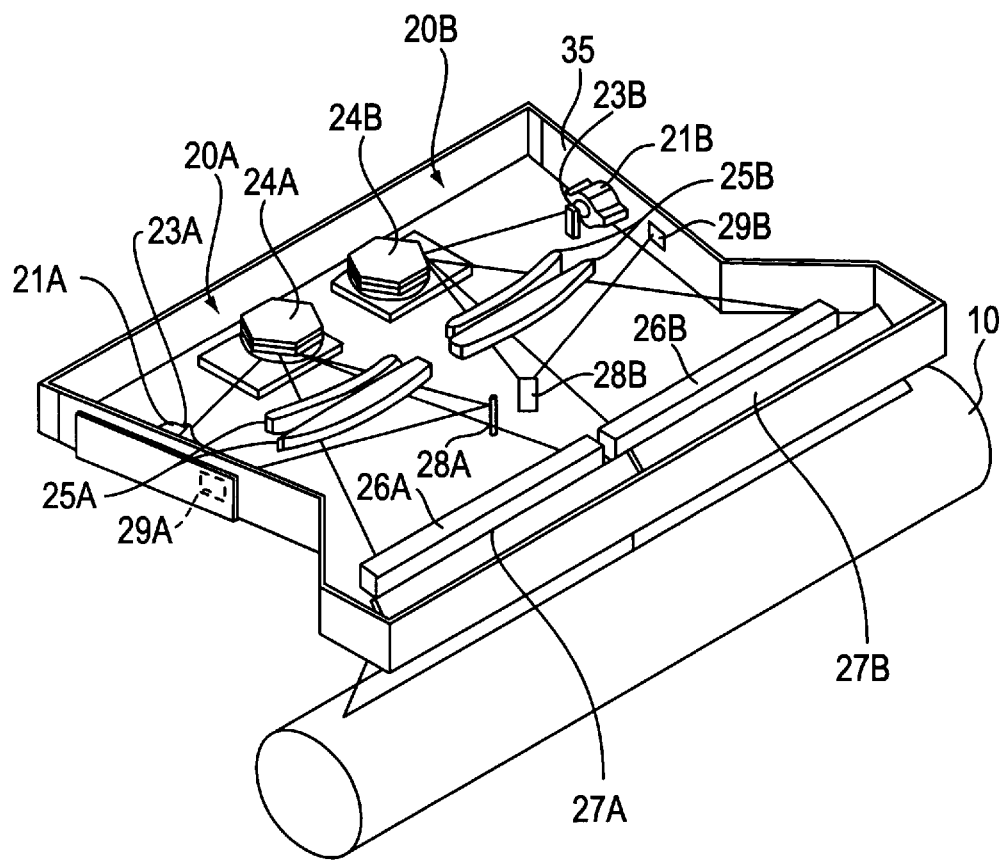
FIG. 1 is a perspective view of an embodiment of a cascade scanning optical system to which the present invention is applied, showing only fundamental elements thereof.

FIG. 1 shows an embodiment of a cascade scanning optical system for scanning the photoconductive surface of a photoconductive drum (rotating member) 10 provided in a laser-beam printer. The cascade scanning optical system is provided with a pair of laser scanning optical systems, i.e., a first scanning optical system 20A and a second scanning optical system 20B. The first and second optical systems 20A and 20B are each designed as a non-telecentric system, so that the incident angle of a scanning laser beam emitted from each of the first and second optical systems 20A and 20B relative to the photoconductive surface of the drum 10 varies in accordance with a variation in the position of the scanning spot of the scanning laser beam on the photoconductive surface in the main scanning direction. The first and second scanning optical systems 20A and 20B are provided with the same optical elements or parts, that is, the first scanning optical system 20A is provided with a laser collimating unit 21A serving as a laser beam emitter, a cylindrical lens 23A, a polygon mirror (scanning laser beam deflector) 24A, an f θ lens group 25A, an auxiliary lens 26A and a mirror 27A, while the second scanning optical system 20B is provided with a laser collimating unit 21B serving as a laser beam emitter, a cylindrical lens 23B, a polygon mirror (scanning laser beam deflector) 24B, an f θ lens group 25B, an auxiliary lens 26B and a mirror 27B. Each of the f θ lens groups 25A and 25B consists of two lens elements as can be seen from FIG. 1. The first and second scanning optical systems 20A and 20B are arranged side by side in a direction parallel to the axial direction of the drum 10 and are supported by a common casing 35 on an inner flat surface thereof.

The laser collimating units 21A and 21B are identical. Each of the laser collimating units 21A and 21B is provided therein with a laser diode LD and a collimating lens group (not shown) for collimating the laser beam emitted from the laser diode LD. In each of the first and second scanning optical systems 20A and 20B, the laser beam emitted from the laser diode LD is collimated through the collimating lens group. Thereafter this collimated laser beam is incident upon the cylindrical lens 23A or 23B positioned in front of the corresponding laser collimating unit 21A or 21B. Each cylindrical lens 23A or 23B has a power in the sub-scanning direction, so that the spot of the laser beam incident thereon is elongated therethrough in the main scanning direction to be incident upon the corresponding polygon mirror 24A or 24B. The polygon mirrors 24A and 24B are each rotated, so that laser beams incident thereon are deflected in the main scanning direction to proceed toward the mirrors 27A and 27B through the f θ lens groups 25A and 25B and the auxiliary lenses 26A and 26B, respectively. Subsequently, the laser beams incident upon the mirrors 27A and 27B are reflected thereby towards the photoconductive drum 10, to thereby scan the same in the main scanning direction.

Each of the auxiliary lenses 26A and 26B has a power mainly in the sub-scanning direction. In order to reduce the size of the cascade scanning optical system, it is possible to omit each of the auxiliary lenses 26A and 26B. In such a case, the design of the f θ lens groups 25A and 25B would be modified in such a way that they would have the equivalent power to that of the combined power of the original f θ lens groups 25A and 25B and the auxiliary lenses 26A and 26B, respectively.

Figure 2:
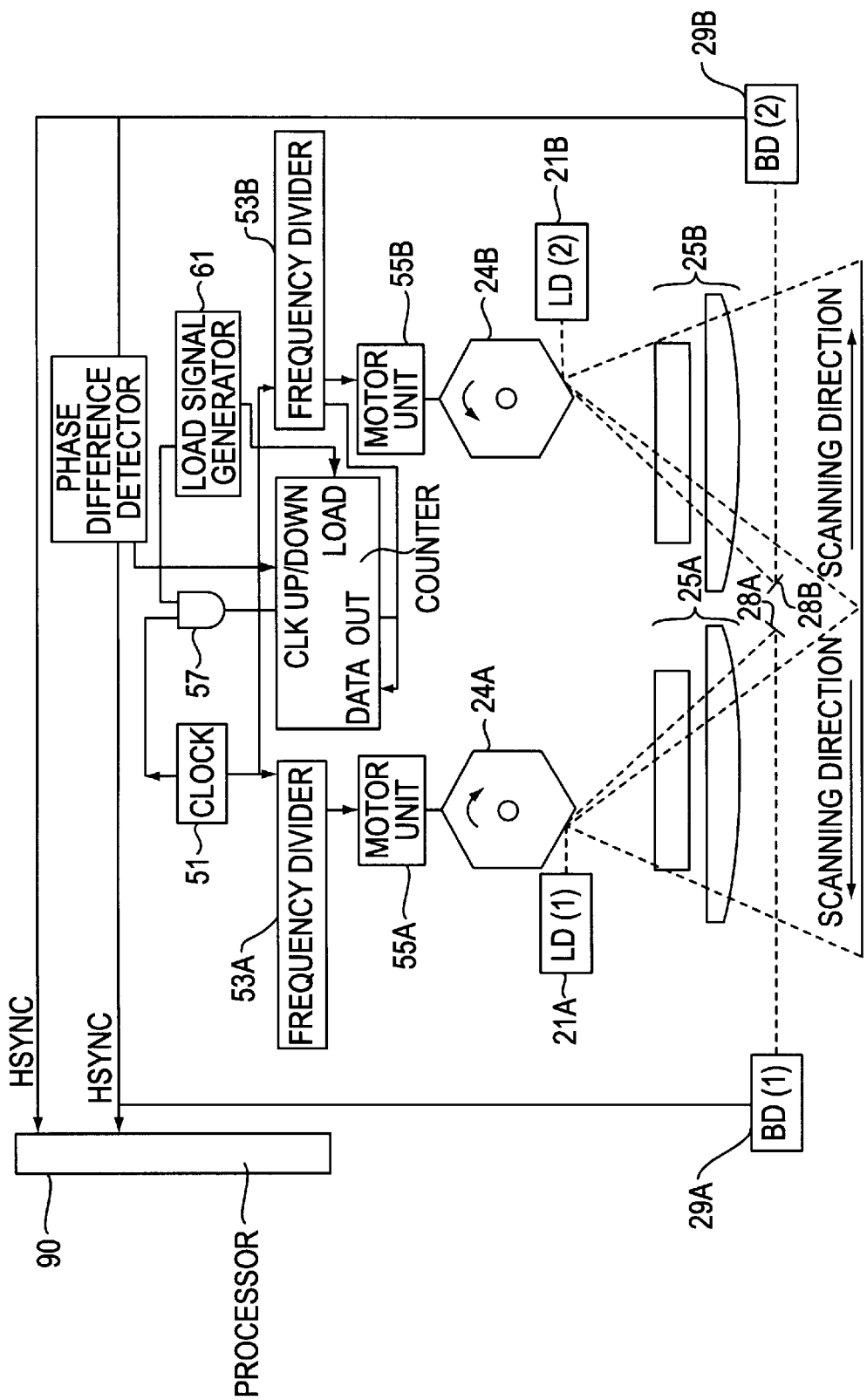
FIG. 2 is a block diagram of an embodiment of a circuit for controlling the cascade scanning optical system shown in FIG. 1.

The polygon mirror 24A rotates in a clockwise direction while the polygon mirror 24B rotates in a counterclockwise direction, as viewed in FIG. 2. Namely, the polygon mirrors 24A and 24B rotate in opposite rotational directions to scan the photoconductive surface of the drum 10 from its approximate center toward respective opposite ends in opposite directions. A mirror 28A is fixedly provided in the casing 35 at a position to receive the scanning laser beam emitted from the f θ lens group 25A before the scanning laser beam is incident on the photoconductive surface of the drum 10 through the auxiliary lens 26A and the mirror 27A at each scanning sweep while the polygon mirror 24A rotates. The laser beam reflected by the mirror 28A is incident on a laser beam detector (BD) 29A fixedly provided in the casing 35 at a position opposite to the mirror 28A. Likewise, a mirror 28B is fixedly provided in the casing 35 at a position to receive the scanning laser beam emitted from the f θ lens group 25B before the scanning laser beam is incident on the photoconductive surface of the drum 10 through the auxiliary lens 26B and the mirror 27B at each scanning sweep while the polygon mirror 24B rotates. The laser beam reflected by the mirror 28B is incident on a laser beam detector (BD) 29B fixedly provided in the casing 35 at a position opposite to the mirror 28B.

The laser diodes LD of the laser collimating units 21A and 21B are each controlled by a processor 90 (see FIG. 2) to turn its laser emission ON or OFF in accordance with given image data to draw a corresponding image (charge-latent image) on the photoconductive surface of the drum 10, and subsequently this image drawn on the photoconductive surface of the drum 10 is transferred to plain paper according to a conventional electrophotographic method. The aforementioned image data input to the processor 90 may be supplied thereto from a computer (not shown). The polygon mirrors 24A and 24B are controlled synchronously with the use of the laser beam detectors 29A and 29B such that on the photoconductive surface of the drum 10 the scanning starting point of a spot of the scanning laser beam emitted from the first scanning optical system 20A is properly and precisely adjacent to the scanning starting point of a spot of the scanning laser beam emitted from the second scanning optical system 20B, and that those two spots move in opposite directions apart from each other in the main scanning direction to thereby form a wide scanning line on the photoconductive surface of the drum 10. With the rotational movement of the photoconductive drum 10 which is synchronized to the rotational movement of each of the polygon mirrors 24A and 24B, a series of wide scanning lines are made on the photoconductive surface of the drum 10 to thereby obtain a certain image (charge-latent image) on the photoconductive surface of the drum 10.

Figure 3:
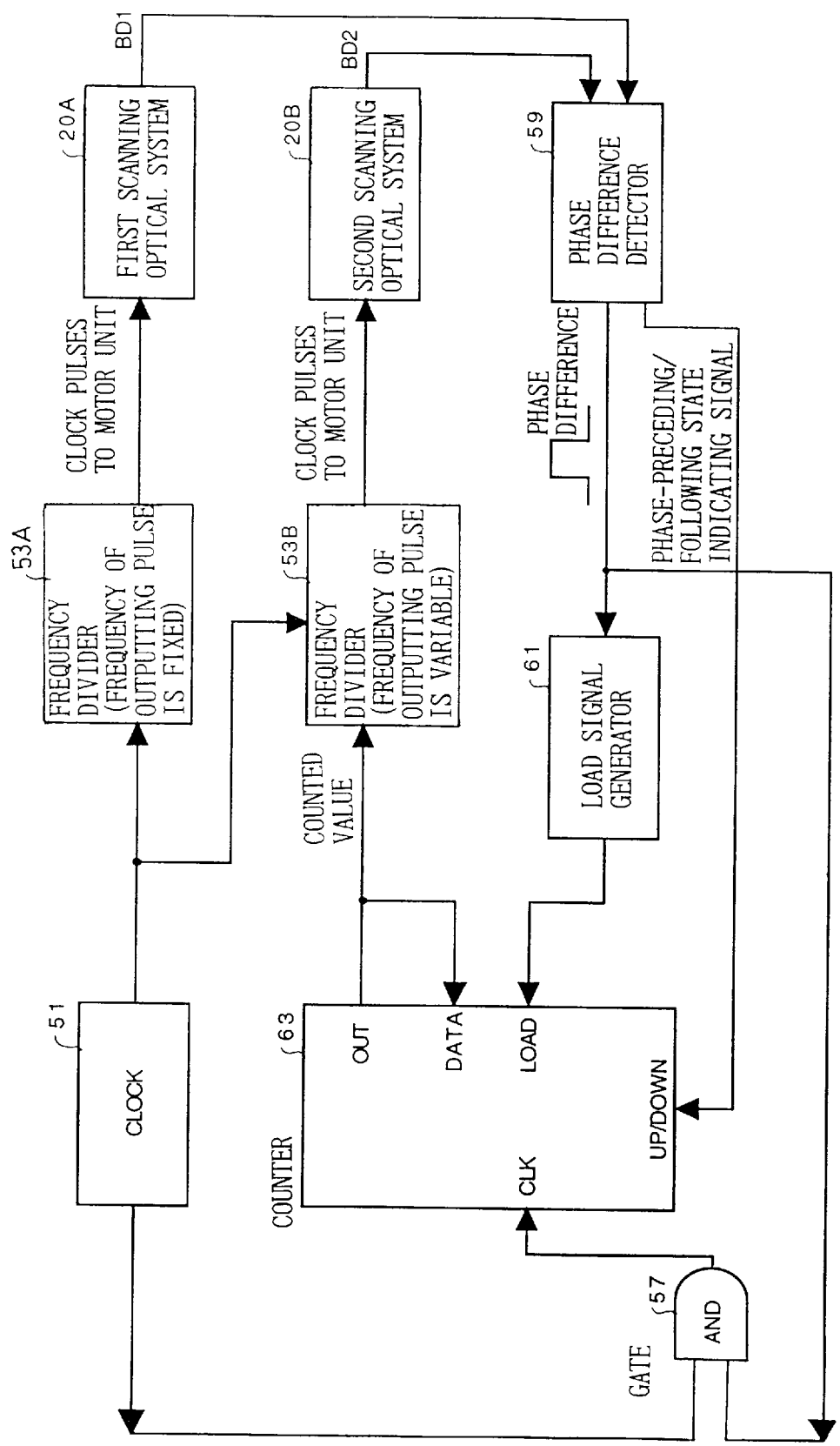
FIG. 3 a block diagram of fundamental elements of the control circuit shown in FIG. 2.

FIG. 2 shows an overall structure of the controller for controlling the cascade scanning optical system of the present embodiment. FIG. 3 shows fundamental parts of the controller shown in FIG. 2. The first and second polygon mirrors 24A and 24B are rotated by first and second motor units 55A and 55B, respectively. When the first and second motor units 55A and 55B start operating upon the power switch turned ON, the motor units 55A and 55B are each controlled, rotating with common clock pulses which are firstly output from a clock pulse generator 51 to be subsequently input to each of two frequency dividers 53A and 53B. Clock pulses output from the frequency dividers 53A and 53B are directly input to the motor units 55A and 55B, respectively.

The frequency divider 53A divides the frequency of input pulses, received from the clock pulse generator 51, by a predetermined fixed value to output the resulting frequency of pulses to the motor unit 55A. The frequency divider 53B divides the frequency of input pulses, received from the clock pulse generator 51, by the same predetermined fixed value to output the resulting frequency of pulses to the motor unit 55B in the case of having input no pulses output from a counter 63. In the case of having input a counted value (i.e., the number of pulses counted by the counter 63) output from the counter 63, the frequency divider 53B divides the frequency of input pulses, received from the clock pulse generator 51, by the input counted value to output the resulting frequency of pulses to the motor unit 55B. The counted value output from the counter 63 is variable, so that the frequency divider 53B increases or decreases the frequency of pulses output therefrom depending upon the counted value.

After the rotation of each motor unit 55A, 55B has become stable and the PLL (phase-lock loop) starts, the rotational speed of the second polygon mirror 24B, i.e., the rotational speed of the second motor unit 55B is controlled in accordance with signals which are output from the second laser beam detector 29B each time the first laser beam detector 29A detects the laser beam emitted from the first polygon mirror 24A. Each motor unit 55A, 55B is provided with a motor having a drive shaft on which the corresponding polygon mirror 24A or 24B is fixed.

The first laser beam detector 29A outputs a signal to each of a phase-difference detector 59 and the processor 90 at the time the first laser beam detector 29A senses a scanning laser beam. Similarly, the second laser beam detector 29B outputs a signal to each of the phase-difference detector 59 and the processor 90 at the time the second laser beam detector 29B senses a scanning laser beam. The phase-difference detector 59 determines a phase difference between the phase of signals output from the first laser beam detector 29A and the phase of signals output from the second laser beam detector 29B in accordance with the signals input from the first and second beam detectors 29A and 29B. Subsequently the phase-difference detector 59 outputs phase difference indicating signals to both an AND gate 57 and a LOAD signal generator 61 and at the same time further outputs a phase-preceding-state indicating signal (high-level signal), which indicates that the phase of the second beam detector 29B precedes the phase of the first beam detector 29A, or a phase-following-state indicating signal (low-level signal), which indicates that the phase of the second beam detector 29B follows the phase of the first beam detector 29A, to an up/down input terminal of the counter 63. The terms "phase difference indicating signal" herein used mean a signal which indicates the magnitude of a phase difference. The LOAD signal generator 61 outputs a load signal to a LOAD signal input terminal of the counter 63 upon receiving a low-level phase difference indicating signal from the phase-difference detector 59.

The clock pulses output from the clock pulse generator 51 and the phase difference indicating signal output from the phase-difference detector 59 are input to respective input terminals of the AND gate 57. Therefore, the AND gate 57 outputs clock pulses input from the clock pulse generator 51 to a clock-pulse input terminal (CLK terminal) of the counter 63 when the phase-difference detector 59 outputs a high-level phase difference indicating signal to the AND gate 57.

Upon receiving a signal (a low-level signal) from either the first or second laser beam detector 29A or 29B, the phase-difference detector 59 starts outputting the high-level phase difference indicating signal. Subsequently the phase-difference detector 59 stops outputting the high-level phase difference indicating signal to start outputting the low-level phase difference indicating signal upon receiving a signal (a low-level signal) from the other laser beam detector 29A or 29B. Therefore, the phase-difference detector 59 does not output the high level phase difference indicating signal in the case when the phase-difference detector 59 simultaneously receives signals output from each of the first and second laser beam detectors 29A and 29B. The phase-difference detector 59 outputs the aforementioned phase-preceding-state indicating signal when having judged that the second laser beam detector 29B outputs a signal before the first laser beam detector 29A outputs a corresponding signal. The phase-difference detector 59 outputs the aforementioned phase-following-state indicating signal when having judged that the second laser beam detector 29B outputs a signal after the first laser beam detector 29A has output a corresponding signal. Accordingly, the phase-difference detector 59 judges whether the second laser beam detector 29B outputs a signal before or after the first laser beam detector 29A outputs a corresponding signal by reference to each time the first laser beam detector 29A outputs a signal.

The operation of the counter 63 will be further discussed with reference to FIG. 4. FIG. 4 is a time chart showing respective timings of the signals output from the first and second laser beam detectors 29A and 29B, the high-level phase difference indicating signal output from the phase-difference detector 59, the phase-preceding or phase-following-state indicating signal output from the phase-difference detector 59, pulses input to the CLK terminal of the counter 63, and a load signal input to the LOAD signal input terminal of the counter 63. This time chart shows a case where a signal output from the second laser beam detector 29B follows a corresponding signal output the first laser beam detector 29A, so that in the time chart the phase-following-state indicating signal output from the phase-difference detector 59 is shown. In the other case where a signal output from the second laser beam detector 29B precedes the corresponding signal output from the first laser beam detector 29A, the phase-preceding-state-indicating signal would be output from the phase-difference detector 59.

When the phase-preceding-state indicating signal or the phase-following-state indicating signal is input to the UP/DOWN terminal of the counter 63, the counter 63 starts counting up or down (increasing or decreasing) the clock pulses input to the CLK terminal thereof in accordance with the signal level of the input phase-preceding or phase-following-state indicating signal. Thereafter the counter 63 stops counting up or down at the moment a load signal is input to the LOAD signal receiving terminal of the counter 63 and subsequently outputs a counted value to the frequency divider 53B. When receiving the counted value, the frequency divider 53B varies the frequency of pulses output therefrom in accordance with the input counted value to increase or decrease the rotational speed of the second motor unit 55B so as to coincide the phase of rotation of the first polygon mirror 24A with the phase of rotation of the second polygon mirror 24B, that is, so as to synchronize the time of detection of the first laser beam detector 29A with the time of detection of the second laser beam detector 29B. Consequently, the first and second polygon mirrors 24A and 24B are rotated with the phase of rotation of the first polygon mirror 24A being coincident with the phase of rotation of the second polygon mirror 24B.

The signals output from the first and second laser beam detectors 29A and 29B are input as horizontal synchronizing pulses HSYNC to the processor 90 so that the signals are a used as reference signals for commencing an operation of writing main scanning data, namely, writing each main scanning line. That is, the processor 90 operates to perform a single scanning (i.e., to draw a horizontal line extending in the main scanning direction on the drum 10) each time a predetermined time-span elapses. Every time a completed horizontal line is drawn on the drum 10, the photoconductive drum 10 is rotated by a predetermined amount of rotation corresponding to one horizontal line so that the following horizontal line is drawn on the drum 10.

As can be understood from the foregoing, according to the present embodiment of the scanning apparatus, even when a phase difference occurs between the phase of rotation of the first polygon mirror 24A and the phase of rotation of the second polygon mirror 24B, the phase difference will be eliminated by the aforementioned operations in which the phase-difference detector 59 detects a phase difference between the phases of the polygon mirrors 24A and 24B, the counter 63 generates a counted value corresponding to the magnitude of the phase difference and then the counter 63 outputs the counted value to the frequency divider 53B to adjust the rotational speed of the second motor unit 55B to eliminate the phase difference. Therefore, the scanning line made by the first scanning optical system 20A and the other scanning line made by the second scanning optical system 20B can be prevented from deviating from each other in either the main scanning direction or the sub-scanning direction on the drum 10.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A scanning apparatus having a cascade scanning optical system, comprising:

a first laser scanning optical system having a first polygon mirror for deflecting a first scanning laser beam to scan a scanning surface to generate a first scanning line;

a second laser scanning optical system having a second polygon mirror for deflecting a second scanning laser beam to scan said scanning surface to generate a second scanning line, wherein said first and second laser scanning optical systems are arranged so as to align said first scanning line with said second scanning line at a point of contact therebetween in a main scanning direction to form a single scanning line;

a first rotating device for rotating said first polygon mirror;

a second rotating device for rotating said second polygon mirror;

a first laser beam detector for detecting said first scanning laser beam at a fixed position;

a second laser beam detector for detecting said second scanning laser beam at a fixed position;

a first controller for controlling said first rotating device to rotate said first polygon mirror at a constant speed;

a counter for counting a difference in time between a first moment said first laser beam detector detects said first scanning laser beam and a second moment said second laser beam detector detects said second scanning laser beam by reference to said first moment; and a second controller for controlling said second rotating device to adjust a rotational speed of said second polygon mirror relative to the rotational speed of said first polygon mirror in accordance with said difference in time.

2. The scanning apparatus according to claim 1, wherein said second controller controls said second rotating device to eliminate said difference in time.

3. The scanning apparatus according to claim 1, wherein said first polygon mirror deflects said first scanning laser beam to scan a part of said scanning surface to generate said first scanning line, and wherein said second polygon mirror deflects said second scanning laser beam to scan another part of said scanning surface to generate said second scanning line, and wherein said first laser beam detector detects said first scanning laser beam before said first scanning laser beam scans said part of said scanning surface, and wherein said second laser beam detector detects said second scanning laser beam before said second scanning laser beam scans said another part of said scanning surface.

4. The scanning apparatus according to claim 3, wherein said first and second polygon mirrors rotate in opposite rotational directions so that said first and second scanning laser beams respectively scan said part and said another part of said scanning surface from an approximate center of said scanning surface toward respective opposite ends of said scanning surface in opposite directions.

5. The scanning apparatus according to claim 1, further comprising:

a clock pulse generator; and a phase-difference detector, which receives respective signals output from said first and second laser beam detectors, for detecting a phase difference between the phase of signals output from said first laser beam detector and the phase of signals output from the second laser beam detector, the magnitude of said phase difference corresponding to the duration of said difference in time, wherein said phase-difference detector generates a signal having a pulse duration corresponding to said magnitude of said phase difference, wherein said counter inputs clock pulses generated by said clock pulse generator to count said clock pulses within a time-span corresponding to said difference in time, and wherein said second controller controls said second rotating device in accordance with the number of said counted clock pulses to eliminate said phase difference.

6. The scanning apparatus according to claim 5, wherein said phase-difference detector judges whether said second moment is ahead or behind said first moment.

7. The scanning apparatus according to claim 6, wherein said counter decreases the number of said clock pulses when said phase-difference detector judges that said second moment is ahead said first moment, and wherein said counter increases the number of said clock pulses when said phase-difference detector judges that said second moment is behind said first moment.

8. The scanning apparatus according to claim 6, wherein said counter increases the number of said clock pulses when said phase-difference detector judges that said second moment is ahead said first moment, and wherein said counter decreases the number of said clock pulses when said phase-difference detector judges that said second moment is behind said first moment.

9. The scanning apparatus according to claim 5, wherein said first controller comprises a first frequency divider for dividing a frequency of clock pulses output from said clock pulse generator to output a resulting frequency of clock pulses to said first rotating device so as to rotate said first polygon mirror at said constant speed, and wherein said second controller comprises a second frequency divider for dividing said frequency of clock pulses output from said clock pulse generator to output a resulting frequency of clock pulses to said second rotating device, said second controller varies said resulting frequency of clock pulses output to said second rotating device in accordance with said number of pulses.

10. The scanning apparatus according to claim 1, further comprising a processor for controlling emissions of said first and second scanning laser beams in accordance with signals output from said first and second laser beam detectors.

11. The scanning apparatus according to claim 1, wherein said first laser beam detector is positioned outside a first optical path through which said first scanning laser beam passes to form said first scanning line, and wherein said second laser beam detector is positioned outside a second optical path through which said second scanning laser beam passes to form said second scanning line.

12. The cascade scanning optical system according to claim 1, further comprising a drum having said scanning surface on a periphery of said drum.

13. The cascade scanning optical system according to claim 1, wherein said first and second laser scanning optical systems are composed of the same optical elements.

14. The cascade scanning optical system according to claim 13, wherein said first and second laser scanning optical systems are symmetrically arranged.

* * * * *